United States Patent Office 3,219,538
Patented Nov. 23, 1965

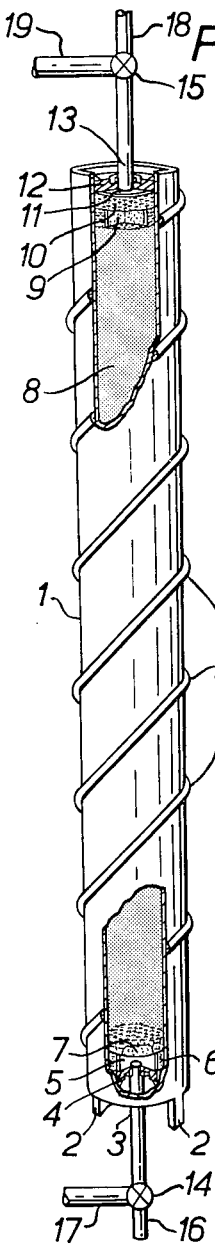
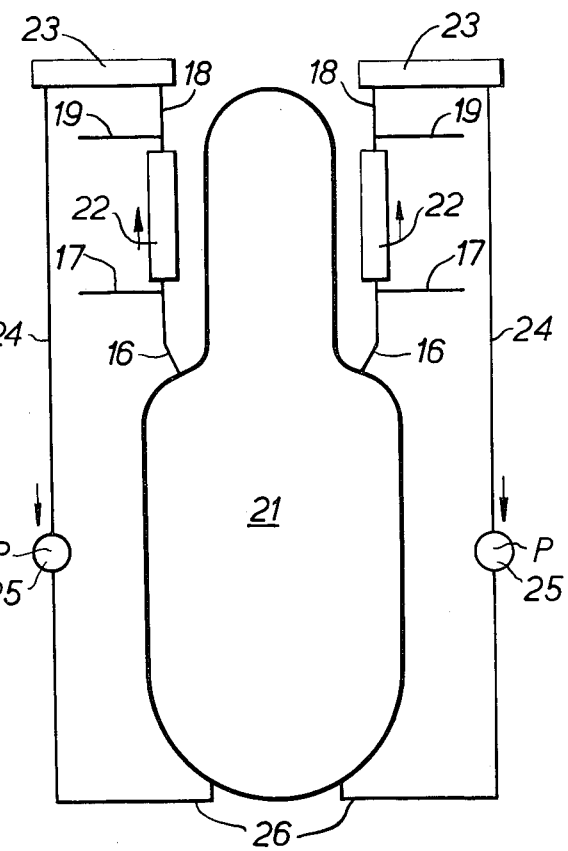

3,219,538
APPARATUS AND METHOD FOR REMOVING FISSION BY-PRODUCT METAL VAPORS IN GAS COOLED NUCLEAR REACTOR SYSTEM
Eugen Glueckauf, Chilton, Didcot, Ronald Henry Flowers, Wallingford, Didcot, and Frederick Charles William Pummery, Tilehurst, Reading, England, assignors to United Kingdom Atomic Energy Authority, London, England
Filed Dec. 12, 1962, Ser. No. 244,161
Claims priority, application Great Britain, Dec. 20, 1961, 45,723/61
13 Claims. (Cl. 176—37)

The present invention relates to nuclear reactors and, more particularly, to high temperature nuclear reactors using ceramic or cermet fuels.

It is convenient to define the preferred type of fuel for such reactors as comprising a small spherical fuel centre known as a "kernel" which is surrounded by a "coating," the kernel and coating together forming a "nodule." These nodules may be embedded in a "matrix" to form a fuel "compact" and a number of these compacts may, if desired, be assembled together and may be enclosed within an outer "sleeve" to form a fuel "element." In the preferred design, the kernel is composed of uranium carbide and the coating is pyrolitic carbon, this arrangement being specifically designed so as to reduce the escape of fission product gases such as krypton from the nodules. In this design moreover, the matrix is carbon or graphite and is sheathed in graphite to form a fuel element. It should be noted that the terms "carbon" and "graphite" are used interchangeably herein unless otherwise specified, as the conversion of carbon to graphite is effected under heat and, since there is no sharp transition point, the carbon may be partially graphitised. Furthermore, the initial starting material may well be a mixture of graphite and carbon.

In the reactor, the fuel elements above described may, if desired, be grouped into fuel element assemblies and each such assembly will be located in a channel in, for example, a moderating material such as graphite. Coolant gas, e.g. helium, carbon dioxide or carbon monoxide, is forced through the channel and is heated by the fuel element. For thermodynamic reasons it is known to be desirable to have the coolant gas raised to as high a temperature as possible as this gas is also the working fluid.

In a fuel element as above described and designed to operate at a maximum temperature in the region of 1600° to 1800° C. the fission product gases such as krypton are essentially contained within the nodules. The fission product iodine has a relatively slow rate of diffusion through the coating and matrix so that in view of its short half life, no fission product iodine will reach the outer surface of the fuel element. On the other hand, fission product metals such as caesium, strontium and barium may diffuse rapidly through the carbon coating, matrix and sleeve, and appear at the surface of the fuel element. Some of these fission product metals are known to have relatively long half lives and a high volatility and cause severe contamination of the coolant gas which, it is assumed, will be in contact with the outer surface of the fuel element. The problem is not altogether solved by a purge system such as is provided in the Dragon reactor, for the purge gas flow must of necessity be of low velocity and it is thought that although the purge gas may pick up fission product metals from the surface of the fuel element, such metals may be largely re-deposited (very shortly after pick up) upon the outer sleeve which defines the purge gas flow channel and will diffuse through this outer sleeve into the coolant gas stream.

It will therefore appear from what has been stated above, that using a fuel element of the type outlined may have the serious defect that fission product metals are liable to appear in the coolant gas stream and it is clear that this is highly undesirable. On the other hand, it is also clear that the fuel elements outlined have advantages as compared with other proposed fuel elements for high temperature reactors. Accordingly it is an object of the present invention to provide, in a reactor, means for reducing the amount of fission product metals present in the coolant gas stream.

According to the present invention there is provided apparatus for the removal of fission product metals from the coolant gas stream of a nuclear reactor comprising a filter bed in the form of a mat or cloth of "glass" fibres, or a packing of discrete "glass" bodies, through which the gas stream is passed to remove the metallic fission products from the gas stream.

According to a further aspect of the present invention there is provided a method for the removal of fission product metals from the coolant gas stream of a nuclear reactor which comprises passing said gas stream through a filter bed in the form of a mat or cloth of "glass" fibres, or a packing of discrete "glass" bodies, the fission product metals being effectively retained by the material of the filter bed.

The term discrete bodies should be interpreted in the widest possible sense and will include rings, rods, tubes and beads.

The said filter bed is preferably located downstream of the fuel elements, where the fission product metals arise, but before the heat exchanger or the like in which the gas gives up its useful heat.

In order to prevent radiation damage to the filter bed and possible release of fission products therefrom as well as loss of neutrons from the reactor core by absorption in the filter bed, it is desirable to locate the filter bed outside the neutron core of the reactor.

A single filter bed will normally be all that it is necessary to provide. However, it may be desirable to provide a filter bed for each channel or group of channels, especially if the design is such that the filter beds will then be available for replacement. If a single bed is provided it will not normally be possible to replace it but this is no major disadvantage as the effective capacity of the bed can normally be made greatly in excess of requirements.

It should not be thought that the filter bed requires to have effective apertures small enough to trap the metal atoms as this is quite unnecessary; it is only necessary that there should be a statistically very high chance of a metal atom striking the glass in its passage through the bed.

The filter bed, it is clear, has to be located in the high temperature zone of the reactor, and consequently the glass must be chosen so as to be stable at temperatures in the region 700–800° C., the contemplated gas outlet temperature from such reactors. Any suitable glass may be used, but at the present time it seems preferable to use glasses based on the oxides of potassium or caesium, iron aluminum, calcium and/or silicon, for example a glass having a composition, by weight of 75% silica, 15% potassium oxide and 10% calcium oxide. Although borosilicate glasses are known to be stable at the required temperature, their use is not preferred as a carry-over of boron into the reactor itself would always be a possibility. If this carry-over could be prevented, they might prove very suitable.

The word "glass" should be interpreted in the widest sense, as a solid which has sufficient stability to withstand heat, for example a temperature of at least 700° C., without the particles fusing together and also possessing a sufficiently high diffusion coefficient to allow the absorbed fission products to diffuse into the whole mass of the material and so attain a state of high dilution, and consequently of low volatility.

Glasses and slags have this particular property, but fluoride-glasses or even some crystalline substances should not be excluded provided that they offer the property of fast dissipation of the fission products in the interior, and their conversion to ionic form is possible.

Desirably, the filter bed should be thick enough to introduce a pressure drop approximately equal to that introduced by the reactor in order that the fission products be effectively retained by the filter bed.

An embodiment of the present invention will now be described with reference to the accompanying drawings in which FIGURE 1 is a fragmentary view of a filter bed for use according to the invention and FIGURE 2 is a flow diagram of the coolant gas.

The filter bed is contained in a stainless steel tube 1, which is extended at its lower end by two support lugs 2. The coolant gas stream containing the fission product metals enters the filter bed at its base via an inlet pipe 3. The pipe 3 passes through a central aperture in an end plate 4 and opens into a space 5. The space 5 is enclosed by end plate 4, gauze filter ring 6 and a packing of silica wool 7. The glass passes from space 5, through the packing 7 and into the glass bodies 8 of the filter bed itself. The gas stream passes slowly through the packing of glass bodies, the metallic fission products being absorbed on the glass as the gas passes through. The gas leaves the filter bed by passing through a second packing of silica wool 9, and into a second space 11. This second space 11 is enclosed by the packing 9, a gauze filter ring 10 and an end plate 12 in a similar fashion to space 5. The gas exits from space 11 through an outlet tube 13 in the end plate 12. The tube 13 then carries the gas to a heat exchanger via a valve 15 and a pipe 18.

After a period of use the bed may become "saturated" with the metallic fission products, and require regeneration. This may be done by fitting pipes 3 and 13 with valves 14 and 15 respectively which may be closed to the flow of the contaminated coolant gas via pipes 16 and 18 opened to a stream of a second gas which is free from any fission products. This stream of second gas enters the filter bed via a pipe 17 which leads to valve 14 and thence into inlet pipe 3. As it passes through the filter bed the second gas sweeps away the fission products retained by the glass bodies and the bed is then available for use again.

As the gas passes through the filter bed it will tend to lose heat to the bed, this being very undesirable. Such heat losses may be prevented by heating the filter bed by means of a heating coil 20. This heating coil may desirably be thermostatically controlled by thermocouples (not shown) measuring the inlet and outlet temperatures of the gas, so that the drop in temperature of the gas passing through the filter bed will only be small.

In FIGURE 2, a reactor 21 has a number of outlet channels 16 for the coolant gas. Each of the channels 16 lead the gas into a filter bed 22, of the type hereinbefore described. The coolant gas leaves the filter bed and passes through a pipe 18 into a heat exchanger 23 to give up its useful heat. From the heat exchanger, the gas then passes along a pipe 24, through a pump 25 and is returned to the reactor via a pipe 26. Pipe 26 may return the gas to the base of the reactor as shown, or pipes 26 and 16 may be one unit, pipe 16 being the inner pipe and pipe 26 being the outer annular space between two co-axial pipes.

The filter beds 22 are swept clear of fission products by means of pipes 17 and 19 as hereinbefore described. Conveniently filter beds 22 may be paired so that one is being swept clear of fission products whilst the other is filtering the fission product from the coolant gas stream.

In an alternative arrangement, the filter bed is within the reactor itself, situated in the "neck" of the reactor. The bed is supported on a grid, for example of graphite which may, if necessary, have steel members supporting it and strengthening it. The holes in the grid may be of several inches diameter whilst the bed itself desirably consists of glass rods which may be about 1 foot long and 1 inch diameter. The filter bed need consists of only a few layers of the glass rods, this being suffcient to ensure the metal atoms contained in the gas will have a reasonable probability of contacting the glass and thus being absorbed by the filter bed. It will be appreciated that in this form, only one filter bed will be provided and that regeneration of the bed will not be possible. Thus, once the bed is "saturated" it will have to be replaced, but normally the design of the filter bed will be such that its capacity for the fission product metals will be far in excess of that required. This alternative form, being in the containing pressure vessel of the reactor, will be readily maintained at the desired temperature of operation and will not introduce any excessive pressure drop in the gas flowing through it.

*Example 1*

In one experiment in accordance with the invention a glass composition comprising, by weight, 75% silica, 15% potassium oxide and 10% calcium oxide was found to melt at 750°. A filter bed 1 inch long and ¾ inch in diameter was made of fibres of this glass, the fibres being 0.2 mm. in diameter. A stream of helium with tracer radioactive caesium at 700° C. was passed through the bed at a rate of 2 cc./sec. It was found that 55% of the caesium was retained by the glass filter bed, the remaining 45% of the caesium passing through and depositing in a cooler region beyond the filter bed in a period of two hours. The filter bed temperature was between 650° and 750° C., the cooler region in which the caesium deposited being about 450° C.

The active glass filter bed was then held at 700° C. for a further two hours, a stream of helium being passed through at 2 ccs./sec. It was found that 85% of the caesum was retained by the filter bed, the 15% which was removed being deposited in the cooler region of the apparatus.

*Example 2*

In a further experiment in accordance with the invention, the glass fibres used were similar to those used in Example 1, and had the same composition. The filter bed used was 2 inches long and was maintained at a temperature of 700° C. A stream of helium containing tracer radioactive caesium was passed through the filter bed at a rate of 2 ccs./sec., the flow being continued for a total of 114 hours, with breaks at 2 hours and 26 hours for examination of the bed. It was found that less than 10% of the caesium passed through the filter bed. Sectioning of the plug showed that 90% of the trapped caesium was contained in the first 0.3 inch of the filter bed, the other 10% being uniformly distributed throughout the remainder of the bed. This pattern of distribution did not change noticeably during the whole run.

The active filter bed was then maintained at a temperature of 1000° C. for 21 hours, a stream of helium being passed through at 2 ccs./sec. A second filter bed, ¼ inch thick, was situated downstream of the active bed, and was maintained at a temperature of 700° C. The fibres of the active glass underwent considerable fusion during the heating at 1000° C. It was found that 94% of the caesium remained in the filter bed, and only a small quantity (0.3%) of the caesium reached the second filter bed to be retained. The remaining (5.7%) caesium was deposited between the two filter beds.

We claim:

1. Apparatus for the removal of fission product metals from the coolant gas stream of a nuclear reactor comprising a filter bed, through which the gas stream is passed to remove the metallic fission products from the gas stream, said filter bed comprising a packing of discrete bodies, the material of such bodies being a glass which has sufficient stability to withstand a temperature of at least 700° C. without the particles fusing together, and possessing a sufficiently high diffusion coefficient to allow the absorbed fission products to diffuse into the whole mass of the material.

2. Apparatus as claimed in claim 1 wherein the packing of discrete bodies takes the form of a mat of fibres.

3. Apparatus as claimed in claim 1 including a heat exchanger associated with the reactor in which the filter bed is positioned so that the coolant gas containing the fission product metals, after leaving the reactor, passes through the filter bed before passing into said heat exchanger to give up its useful heat.

4. Apparatus as claimed in claim 3 in which the filter bed is located outside the neutron core of the reactor.

5. Apparatus as claimed in claim 4 in which the material of the filter bed is a glass composition comprising oxides selected from the group of oxides consisting of the oxides of potassium, caesium, iron, aluminum, calcium and silicon.

6. Apparatus as claimed in claim 5 in which the glass of the filter bed has a composition by weight of 75% silica, 15% potassium oxide and 10% calcium oxide.

7. Apparatus as claimed in claim 4 in which a plurality of channels are provided for the passage of coolant gas through the reactor core and at least one filter bed is provided for the said channels in the reactor core.

8. A method for the removal of fission product metals from the coolant gas stream of a nuclear reactor, which comprises passing the said gas stream through a filter bed in the form of a packing of discrete solid bodies formed of a "glass-like" solid which has sufficient stability to withstand a temperature of at least 700° C. without the bodies fusing together, and possessing a sufficiently high diffusion coefficient to allow the absorbed fission products to diffuse into the whole mass of the material, the fission product metals contained in the gas stream being effectively retained by the material of the filter bed.

9. In combination with a nuclear reactor of the type using ceramic fuels and operating at high temperatures, a filter bed in the coolant gas outlet of the reactor for removing fission product metal vapors from the coolant gas stream, said filter bed comprising a packing of discrete bodies, the material of said bodies being a glass which is stable at temperatures of at least 700° C. without the particles fusing together, and which possesses a sufficiently high diffusion coefficient to allow the absorbed fission products to diffuse into the whole mass of the material.

10. Apparatus as set forth in claim 9 further comprising a heat exchanger through which said coolant gas stream passes, said filter bed being located in said stream upstream of said heat exchanger, and further comprising means for heating said filter bed so as to minimize heat losses from the coolant gas to the filter bed.

11. Apparatus as set forth in claim 10 wherein said filter bed is of sufficient thickness to create a pressure drop in said coolant gas approximately equal to the pressure drop of the coolant gas in the reactor.

12. A method for the removal of fission product metal vapors from the coolant gas stream of a high temperature nuclear reactor, comprising passing the said gas stream while at conditions such that at least some of said fission product metals are in vaporous form through a filter bed in the form of a packing of discrete solid bodies formed of a glass-like solid which has sufficient stability to withstand a temperature of at least 700° C. without the bodies fusing together, and possessing a sufficiently high diffusion coefficient to allow the absorbed fission products to diffuse into the whole mass of the material, the fission product metal vapors contained in the gas stream being effectively retained by the material of the filter bed.

13. A method as set forth in claim 12 further comprising the steps of heating the filter bed so as to minimize heat losses from the coolant gas to the filter bed, and creating a pressure drop in the filter bed that is approximately equal to the pressure drop in the reactor.

References Cited by the Examiner

UNITED STATES PATENTS

| | | | |
|---|---|---|---|
| 2,809,931 | 10/1957 | Daniels | 176—53 |
| 2,837,477 | 6/1958 | Fermi et al. | 176—58 |
| 2,940,915 | 6/1960 | Hammond et al. | 176—32 |
| 3,039,948 | 6/1962 | Krucoff | 176—37 |
| 3,057,138 | 10/1962 | Huxster | 55—515 |

FOREIGN PATENTS 1,247,980  10/1960  France.

OTHER REFERENCES

Silverman: (P/571) International Conference On The Peaceful Uses of Atomic Energy, volume 9, 1956, pages 727–735.

CARL D. QUARFORTH, *Primary Examiner.*

REUBEN EPSTEIN, *Examiner.*